(12) United States Patent
Weghaus et al.

(10) Patent No.: US 10,576,933 B2
(45) Date of Patent: Mar. 3, 2020

(54) VEHICLE THEFT PROTECTION SYSTEM

(71) Applicant: HELLA GmbH & Co. KGaA, Lippstadt (DE)

(72) Inventors: Ludger Weghaus, Lippstadt (DE); Daniel Siekmann, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/207,750

(22) Filed: Dec. 3, 2018

(65) Prior Publication Data

US 2019/0111891 A1 Apr. 18, 2019

Related U.S. Application Data

(63) Continuation of application No. PCT/EP2016/062473, filed on Jun. 2, 2016.

(51) Int. Cl.
| | |
|---|---|
| *B60R 25/24* | (2013.01) |
| *G07C 9/00* | (2020.01) |
| *H04B 17/318* | (2015.01) |
| *G01S 5/02* | (2010.01) |
| *H04W 12/06* | (2009.01) |

(52) U.S. Cl.
CPC ............ *B60R 25/245* (2013.01); *B60R 25/24* (2013.01); *G01S 5/0284* (2013.01); *G07C 9/00309* (2013.01); *H04B 17/318* (2015.01); *H04W 12/06* (2013.01); *G07C 2009/00555* (2013.01); *G07C 2009/00793* (2013.01); *G07C 2209/63* (2013.01)

(58) Field of Classification Search
CPC .... B60R 25/245; H04W 12/06; H04B 17/318
USPC ........................................... 340/5.61
See application file for complete search history.

(56) References Cited

U.S. PATENT DOCUMENTS

| | | | |
|---|---|---|---|
| 8,930,045 B2 | 1/2015 | Oman et al. | |
| 2002/0067250 A1 | 6/2002 | Kamlah | |
| 2010/0305779 A1 | 12/2010 | Hassan et al. | |
| 2010/0321154 A1* | 12/2010 | Ghabra | B60R 25/00 340/5.61 |
| 2014/0067161 A1 | 3/2014 | Conner et al. | |
| 2014/0340193 A1* | 11/2014 | Zivkovic | G07C 9/00111 340/5.61 |

(Continued)

FOREIGN PATENT DOCUMENTS

DE 102009014975 A1 9/2010

OTHER PUBLICATIONS

International Search Report dated Mar. 13, 2017 in corresponding application PCT/EP2016/062473.

*Primary Examiner* — Vernal U Brown
(74) *Attorney, Agent, or Firm* — Muncy, Geissler, Olds & Lowe, P.C.

(57) ABSTRACT

A method for wirelessly accessing a vehicle including the steps of: exchanging data between a UID-transponder and the vehicle to verify authorization of the UID-transponder, triangulating a location of UID-transponder relative to the vehicle using at least three first antennas being positioned at three different first positions of the vehicle and providing access to the vehicle under the first authorization condition that the UID-transponder is identified as an authorized UID-transponder and if the location meets a second authorization condition as well, to recognize a relay attack.

11 Claims, 1 Drawing Sheet

(56) References Cited

U.S. PATENT DOCUMENTS

| | | |
|---|---|---|
| 2015/0277428 A1 | 10/2015 | Dackefjord |
| 2015/0302673 A1 | 10/2015 | Seiberts et al. |
| 2016/0027226 A1* | 1/2016 | Gigl .................... G07C 9/00111 340/5.61 |
| 2017/0158169 A1* | 6/2017 | Luo ....................... B60R 25/245 |

* cited by examiner

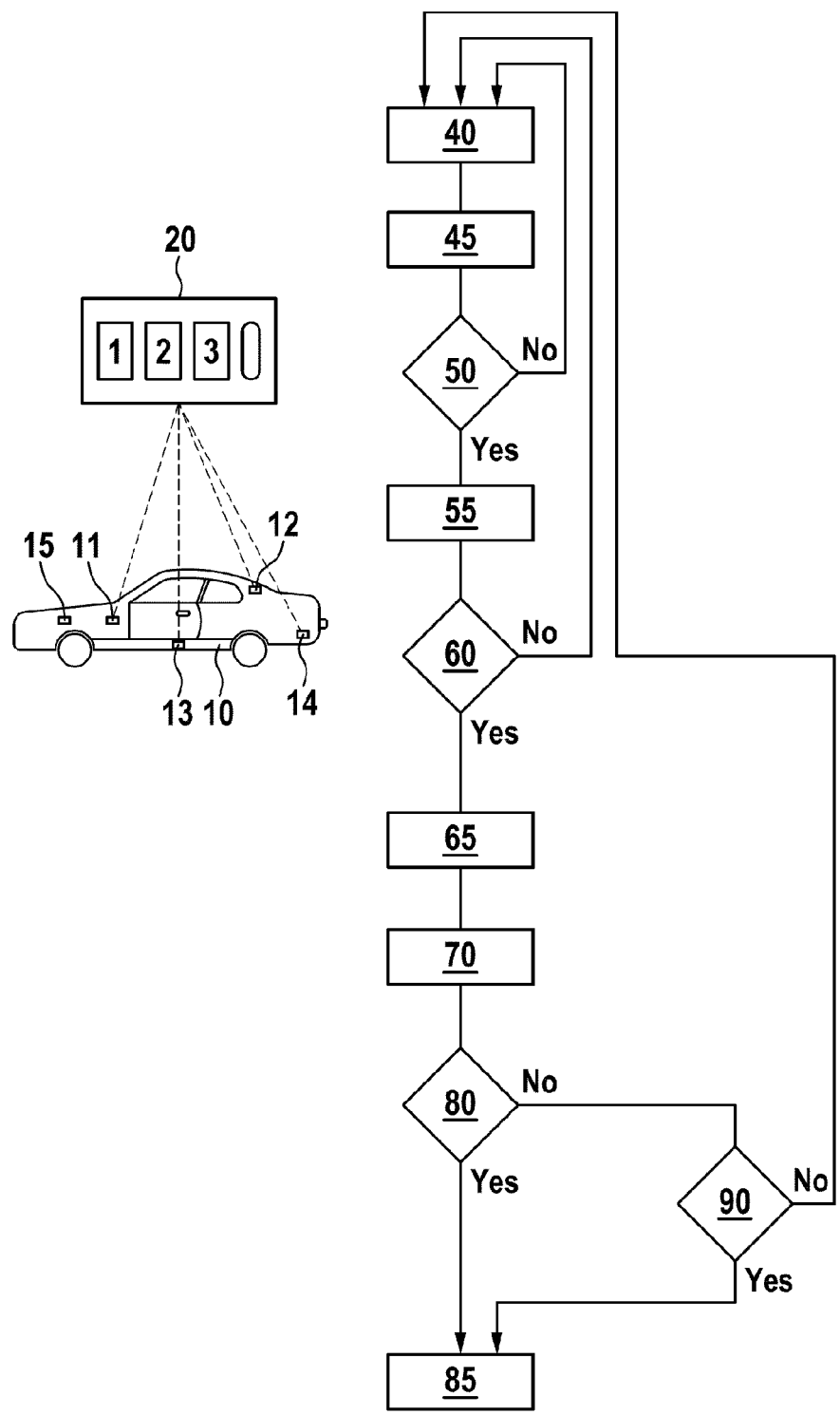

VEHICLE THEFT PROTECTION SYSTEM

This nonprovisional application is a continuation of International Application No. PCT/EP2016/062473, which was filed on Jun. 2, 2016, and which is herein incorporated by reference.

BACKGROUND OF THE INVENTION

Field of the Invention

The present invention relates to a method for enhancing the security of hands-free access and start systems of cars and similar vehicles like boats and aircraft.

Description of the Background Art

Theft protection of cars has been an issue over the last decades. The initial purely mechanical starter locks being activated by a purely mechanical car-key have been combined in the 1990's with a so called electronic immobilizer. The immobilizer comprises an electronic user identification device (a so called UID) and a communication device being integrated in the car, in particular in the car's ECU (Engine Control Unit). The UID and the communication device exchanged identification data using existing transponder technique and only in case the UID fits the car, the ECU enabled a user to start the engine.

The communication between the UID and ECU became over the years more and more sophisticated and safe, enabling to simply omit the mechanical part of the 'car-key', enabling a user carrying the UID, e.g. in a pocket or bag, to open the doors and to start the engine, without the hassle to insert a key into a lock, as soon as the wireless communication between the car the UID was established. These systems are commonly referred to as PEPS-system, where PEPS stands for passive entry/passive start. Commonly available UID are typically active and/or passive RFID-transponders. Herein, we will use the term UID-transponder. These UID-transponders enable a wireless authentication and thus enable a user carrying the transponder, e.g. in a pocket of a trouser or in a handbag to enter and to start the car without a need to fetch the UID-transponder or to insert the UID-transponder into some receptacle.

However, this gain in comfort came with the drawback of reduced theft protection: For unlocking the car doors and starting the engine it is sufficient to enable a radio communication between the UID-transponder and the car. A simple relay (or a chain of relays) being positioned between the UID-transponder being and the car, enabling the communication between the car and the UID-transponder enables a thief to gain access to the interior of the car and even to start the engine and simply drive away. This is scenario is as well known, e.g. as relay attack. At first glance it resembles a man in the middle attack, but different from the man in the middle attack, knowledge about the type of encryption of the communication between the UID-transponder and the car or the corresponding encryption keys is not necessary. The relay simply forwards the signals sent from the car to the UID-transponder and vice versa. The car thus cannot distinguish if the radio signals it receives in response to its own radio signals are provided by an authorized UID-transponder communicating directly or via an (unauthorized) relay. Once started, the engine will for safety reasons not quit, when leaving the vicinity of the relay, enabling a thief to drive the car away to a place enabling to replace or update the security system or to simply disassemble the car into its parts, which can be sold separately.

Attempts to avoid a relay attack have been published in numerous publications: One attempt is to determine the position of the UID-transponder relative to the car, as explained e.g. in US 2014/0067161 A1, U.S. Pat. No. 8,930,045 B2 and to allow operations like unlocking doors and starting the engine only if the UID-transponder is within a predefined distance from the car. The distance can be determined by triangulation based on the signal strength of the radio signal being used for communication between the UID-transponder and the car. However, the signal strength can be varied easily as well by a relay to simulate a close UID-transponder to the car (and or a close car to the UID-transponder). A further approach is disclosed in US 2015/302673 A1, suggesting to measure acceleration data of the UID-transponder by an accelerometer and to compare these acceleration data with a change of the signal strength. Only if the acceleration data matches the change is signal strength, the car can be unlocked and started.

DE 10 2009 014 975 A1 suggests to activate an ultrasonic emitter in the UID-transponder in response to signals received from the car. The car evaluates the ultrasonic signal and thereby identifies the UID-transponder to be in the vicinity of the car. Beyond, the car may communicate information to be encoded in the ultrasonic signal which can be used to identify the ultrasonic signal to originate from an authorized UID-transponder and not from a simply relay. This measure enhances the level of theft protection, as a simple relay is no further sufficient to steal the car. The drawback is the enhanced cost for the additional ultrasonic emitter and receiver.

SUMMARY OF THE INVENTION

It is therefore an object of the present invention to provide a PEPS-system with a high level of theft protection at reduced cost.

The solution is provided by a method for wirelessly accessing a vehicle and a corresponding system as explained below in more detail. 'Accessing' or to 'provide access' means to unlock a vehicle enabling to gain access to its interior and/or to enable to start the vehicle, e.g. by pressing a simple start button to start a combustion engine (if present) and or to activate other controls, e.g. for controlling an electric motor. 'Wirelessly' refers to any kind communication not requiring a direct electric contact, i.e. any kind of radio communication, where 'radio communication' is not limited to a particular band of frequencies. Typical frequencies for RFID-transponders range from long wave e.g. (125 kHz, 134 kHz, 250 kHz, 375 kHz, 500 kHz, 625 kHz, 750 kHz, 875 kHz) over short wave 13.56 MHz and UHF 865-869 MHz (in Europe) and 950 MHz (USA and Asia) to frequencies in the GHz range like 2.45 GHz and 5.8 GHz.

UID-transponders and methods for identifying a transponder to be an authorized transponder are known and commercially available. The UID-transponders are as well referred to as RFID-transponders as explained above. They typically comprise one or more antennas for receiving radio signals. One generally distinguishes between so called active transponders and passive transponders. An active UID-transponder comprises an energy source (typically a battery) enabling the UID-transponder to send radio signals. Passive transponders in turn do not necessarily require a battery, as they draw the required energy from the electromagnetic field being provided by at least one antenna of the vehicle. The passive transponders may as well send data to the vehicle by simply changing the load being provided to the transponder's antenna. This change affects the electromagnetic field and can thus be detected. Very briefly, the UID-transponder comprises a remote communicater with the vehicle (or more precisely with a controller) including a controller, typically a micro controller being configured for controlling the communication.

The method comprises exchanging data between a UID-transponder and the vehicle, to verify an authorization of the UID-transponder. If a UID-transponder is identified to be authorized, a first of at least three authorization conditions is met.

The method further comprises triangulating a location of a UID-transponder relative to the vehicle using at least three first antennas being positioned at three different first positions of the vehicle. This triangulation can be based e.g. on runtime measurement of the signals being exchanged between the UID-transponder or as well on a simple signal strength measurement. Most of the currently available transponders already provide so to speak by default the measurement of an RSSI (Received Signal Strength Indicator) value. For example, the UID-transponder may determine the signal strengths of three signals each being emitted by one of the first antennas. Theoretically four first antennas would be needed to define a location in space of the UID-transponder, but in practice three first antennas are sufficient, as three antennas provide only two possible locations and one of these can be ruled out by plausibility checks. The UID-transponder may either communicate these signal strengths back to the vehicle which may, based on the power of the corresponding emitted signals (and the antenna geometry and the vehicle geometry, which are known by design) determine for each signal a surface in space where the UID-transponder may be located. These surfaces are referred to as ISO-surfaces, as on these surfaces one may expect for a given emitted signal (being emitted by a defined first antenna) the same received signal strength at any point of the ISO-surface. These ISO-surfaces intersect and thus enable to localize the UID-transponder at least approximately at the point of intersection of the ISO-surfaces. Alternatively, the UID-transponder may determine its position similarly. In this case the information about the first antennas' positions in the vehicle coordinate system and the antennas' characteristics and the power of the emitted signals are preferably stored and/or communicated to the UID-transponder. Alternatively or additionally, the at least three first antennas may determine a signal strength of a radio signal being emitted by the UID-transponder, enabling to triangulate the UID-transponder's location.

The location being obtained by triangulation enables to verify whether the UID-transponder is located in a predefined range of locations or not. This can be considered as second authorization condition, i.e. if the UID-transponder is located in the predefined range, the second authorization condition is met. The predefined range(s) of locations, can be e.g. sectors just in front of a door handle (with radius of e.g. a few meters) of the vehicle or the space being enclosed by the vehicle. Depending on the predefined location one may assume that a person being in possession of the UID-transponder is in the close proximity of the vehicle or even inside the vehicle. Thus, the second authorization condition enables to assume (in case of normal authorized use of the UID-transponder) that the authorized person carrying the UID-transponder has the vehicle in sight.

Thus, if the first and second authorization conditions are both met, an access control unit may generally provide access to the vehicle. But, to safely exclude a relay attack, the method preferably further comprises determining, based on the triangulated location a first estimate value of a received signal strength of a signal being transmitted with a known power from the at least one second antenna to the UID-transponder or vice versa wherein the second antenna is positioned at a second position of the vehicle. The first estimate value of the signal strength may be considered as a predicted value of a received signal strength under a given set of conditions. The prediction can be made based on a model or on measurements being stored in a look-up table (or a combination thereof).

In addition the actually received signal strength of a signal being emitted with the known power by one of the UID-transponder or the at least one second antenna and which is received by the respective other is measured. In other words, the predicted signal strength is measured or more formally: a measurement is performed implementing the assumptions of the prediction. This enables to compare the predicted and the measured signal strength.

Next, it can be determined if the estimated value of the received signal strength matches within a predefined accuracy the measured received signal strength. If it matches, a third authorization condition is met. If the estimated value of the received signal strength does not match within the predefined accuracy the measured received signal strength, the third authorization condition is not met. The case where the first and second authorization conditions are met but the third authorization condition is not met can be considered as a (possible) attempt of a relay attack.

For example a first estimate value of the distance between the UID-transponder and at least one first second antenna may be determined based on a look-up table and/or a (theoretical or empirical) model. Further, at least one second estimate value of the distance between the UID-transponder and the at least one first second antenna may be determined. This at least one second estimate value is preferably based on a signal strength measurement of a signal being exchanged between the UID-transponder and the at least one second antenna and/or a runtime measurement. This enables to test the third authorization condition, as in case of a relay attack, the first and second estimates of the distance would not match.

The second authorization condition already provides some protection against a relay attack, but in case of a relay attack a thief would have to simulate the signals of all at least three first antennas by the relay and find a set of accepted signal strengths. This can be done by repetitively altering the signal strength of a single signal (based on typical initial values for the remaining two signal strengths) and is this only a matter of seconds, if at all. The third authorization condition is very difficult to simulate using a relay, as it requires additional hardware and knowledge about the position of the second antenna(s), the UID-transponder and the signal strength of the emitted signal on which the second estimate is based. It does not suffice to provide a simple triple being positioned somewhere in an authorized range, but the fourth value must absolutely match with the previously triangulated location. This means, if the UID-transponder receives a signal being emitted by the fourth antenna and if the second estimate is based on the signal strength of the signal being by the UID-transponder from the second antenna(s), the relay cannot simulate the signal of the second antenna(s) without knowledge of the UID-transponder's real position, because a simple proportional scaling of the signal strength of a simulated second antenna's signal strength will not provide the required matching of the first and second distance estimates. To simulate the correct signal strength of the second antenna(s), precise knowledge about the UID-transponder's actual position is required. This information is not available to the relay. Thus, failure of the third authentication condition may be considered as detection of a relay attack. And thus access is not granted (unless a relay attack can be excluded by other test.)

An advantage of the invention over the prior art suggestions to recognize relay attacks, is that no additional hardware such as ultrasound-modules, no accelerometers or the like are required. Modern vehicles already comprise a number of antennas that enable an overdetermined determination of the UID-transponder's location.

The security maybe further enhanced by determining a trajectory of the UID-transponder in space, e.g. relatively to the vehicle. This may be accomplished by iteratively triangulating the location of UID-transponder relative to the vehicle. If the trajectory meets a further authorization condition (referred to as trajectory condition) at least in addition to the first and second authorization condition access may be granted as well. The trajectory condition tests, if the determined trajectory matches within given boundaries the trajectory of a UID-transponder in a set of predefined use-cases. Thus, if a relay tries by arbitrarily altering the signal strength to simulate different UID-transponder positions to find a signal setting that corresponds to an accepted located, the trajectory will be discontinuous.

Additionally or alternatively, the velocity of the UID-transponder as function of time relative to the vehicle may be determined, based on repetitively triangulating the location of UID-transponder relative to the vehicle and/or based on the signal strength measurement of a signal being exchanged between the UID-transponder and the at least one second antenna. Access may be granted only if the velocity meets a further authorization condition (referred to as velocity condition), at least in addition to the first and second authorization conditions. Testing the velocity condition enables as well to detect a relay attack, if the relay searches essentially arbitrarily for an allowable set of signal strengths for the first antennas. In this case the velocity would be discontinuous.

Further, the acceleration of the UID-device in space may be determined e.g. like in the prior art approaches as well by an accelerometer (e.g. a gyroscope, a mems acceleration sensor or the like) and/or based on repetitively determining the UID-transponder's location and/or velocity as explained above. The acceleration enables a further authorization condition (acceleration condition) e.g. by testing if the acceleration complies with the trajectory and/or velocity and or predefined boundaries and/or allowed use cases.

The method may comprise measuring the orientation of the magnetic field vectors of the signals being emitted by at least two of the first and second antennas by the UID-transponder, and to provide access only, if the orientations of the magnetic field vectors match a further authorization condition (orientation condition) as well. For example, reference orientation values may be stored in dependency of at least one parameter of e.g. the UID-transponder in a lookup table and only if the measured orientation matches the stored orientation within a given accuracy, the orientation condition is met. The parameter(s) may comprise for example at least one of the location of the UID-transponder. The orientation of the magnetic field vectors can be measured by three antennas having three linearly independent orientations in space. Thus, for a successful relay attack the relay would not only have to simulate the appropriate signal strength, but as well of the magnetic field vector, being rather difficult and thus expensive. A relay attack thus becomes less (if at all) economic.

Measuring the orientation of the magnetic field vectors of the signals being emitted by at least two of the first and second antennas by the UID-transponder enables as well to determining the orientation of the UID-transponder relative to the vehicle based on the orientation of the magnetic field vectors. This orientation may be used as well as criterion, i.e. based on approved use cases of the UID-transponder, the measured orientation and/or change in orientation may be compared to a given orientation and/or given change in orientation. If the measured orientation and/or change in orientation matches within a given boundary the corresponding given value(s), the orientation criterion is met and access can be granted if at least the first authorization criterion is met as well.

In case a relay attack was detected, i.e. if the third authorization condition was not met, although at least the first condition was met access may however be provided, if the presence of the UID-transponder was verified by the vehicle either by a mechanical contact (mechanical key-lock test) and or if an electric connection enabling identification of the UID-transponder has been established successfully, as in these cases the UID-transponder is obviously present in the vicinity of the vehicle. In other words, the method may comprise providing access to the vehicle in case the third authorization condition was not met but the first and second authorization conditions have been met upon verification of the presence of the UID-device via a mechanical and/or electrical contact with the vehicle and/or upon a signal being provided by the UID-transponder in response to a manual actuation of a sensor being attached to the UID-transponder.

To further reduce the probability of a successful relay attack, access to the vehicle is generally denied for a given amount of time (being longer than a cycle for testing the first, second and third authorization condition), if the first and second authorization conditions have been met, but the third authorization condition or one of the above explained further conditions have not been met. The given amount of time, i.e. the delay preferably increases with the number of subsequently detected relay attacks to thereby limit the number of attempts per unit of time. For example, if the delay after the first attack is 1s and if the delay doubles with each unsuccessful attack, the relay would have to wait for about 17 min between the $9^{th}$ and $10^{th}$ attempt to find set of signal strengths that provides simulated distances matching the second and/or the third authorization condition.

A system for implementing the method comprises a main controller (as well referred to as 'access control unit'), which may e.g. be integrated in an ECU of a vehicle. The system further comprises a set of antennas being connected to the main controller. Above we referred always to the complete vehicle, but the system may of course be sold separately. The term vehicle can be replaced by access control unit for a vehicle being connected to a set of antennas which can be grouped in into a first set of antennas ('first antennas') being configured to enable a triangulation the UID-transponder and a second group of antennas (comprising at least one antenna, 'second antenna(s)'). The set of antennas further comprise at least one second antenna. The main controller is connected to the first and second antennas and is configured to process signals received by the first and second antennas and/or to transmit data by emitting signals via the first and second antennas.

The system further comprises at least one UID-transponder being configured to wirelessly communicate with the access control unit. The UID-transponder is thus configured to send and/or receive radio signals to and/or from the first and second antennas. The UID-transponder thus comprises at least one transponder antenna and a transponder controller being configured to exchange data via the antennas with the access control unit i.e. with the main controller. The system is configured to perform the method of the invention as explained above in detail, i.e. based on a first authentication protocol the authentication of the transponder is tested. If the UID-transponder is identified to be authorized, the location of the transponder is measured by triangulation based on a signal exchange between the UID-transponder and the first antennas. In practice the main controller may control each of the first antennas to emit an (initial) signal with a given power. The UID-transponder may detect the signals and measure the received signal strength for each of the first antennas. Associated to each of these received signal strengths is a so called ISO-surface, i.e. a surface where the respective signal strength can be expected to be measured in response to the respective initial signal.

These ISO-surfaces intersect (optimally) in a point, which corresponds to and thus defines the location of the UID-transponder. The determination of the location can be performed by the UID-transponder and/or the main controller. If the main controller is configured to determine the UID-location, the UID-transponder is configured to transmit values being representative of the received signal strengths to the main controller by broadcasting the information via the transponder antenna. The main controller in turn is configured to receive the signal strength information by at least one of the first or second antennas. Further, the main controller is configured to emit a second initial signal via at least one second antenna and the UID-transponder is configured to measure the received signal strength of the second signal, i.e. a second signal strength. Now, at least one of the controllers is configured to verify that the second signal strength corresponds to an ISO-surface that comprises the previously determined location. Under the assumption that the ISO-surfaces are spherical (which in practice is not the case), this is equivalent of determining a first estimation of the distance between the UID-transponder and the second antenna based on the determined location of the UID-transponder and the a priori known position of the second antenna and to determine a second estimate of the same distance based on the received second signal strength. If the two estimates are within a predefined accuracy identical the third authorization condition is met.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE shows a flow diagram of the method for providing or denying access to a vehicle.

DETAILED DESCRIPTION

The FIGURE shows a UID-transponder 10 for providing access to a vehicle. As indicated the UID-transponder 10 may having buttons (labeled 1, 2, 3) to actively send commands to a vehicle 10, like e.g. enable heating, open trunk, unlock doors or the like. The vehicle 10 comprises a controller, i.e. an access control unit 15 for providing or denying access to the vehicle as indicated by the flow diagram. Initially the access is denied (box 40) and as soon as the UID-transponder 20 is within the range of the antennas 11 to 14 (the number of antennas can be changed as required) of the vehicle a communication protocol is started by some kind of handshake mechanism (box 45). Next, the method proceeds to box 50 symbolizing a first authentication condition. In this step 50, the UID-transponder 20 and the vehicle exchange data to verify, if the UID-transponder 20 is generally authorized to provide access to the vehicle, or simply if the UID-transponder matches the vehicle. This is the normal 'key-lock' verification. If the first authorization condition is not met (box 50→NO), access remains denied (box 40) and the vehicle 10 waits for a further transponder to initiate the handshake mechanism.

If the first authorization condition is met (box 50→YES), the method continues to box 55 symbolizing determining the location of the UID-transponder 20 relative to the vehicle 10. This determination can be based e.g. on triangulation of the position based on signal strength measurements of signals being exchanged between the UID-transponder and a first set of antennas, e.g. so called first antennas 11, 12 and 13. This location enables to test a second authorization condition (box 60): Is the location of the UID-transponder a valid location? Valid locations are generally any location where it simply makes sense to provide access to the vehicle, e.g. a location in the vicinity of the vehicle or inside the vehicle. If the second condition is not met (box 60→NO) access is not provided and the method continues to box 40, i.e. access remains denied and the vehicle waits for a transponder to enter the range of the antennas 11, 12, 13, 14. If the second condition is met (box 60→YES) the method continues with steps 65 and 70. According to step 65 a first estimate value of a received signal strength of a signal of an additional antenna 14 is determined. This means that a theoretically expected signal strength is determined for a signal being sent by the additional antenna 14 (so called second antenna 14) and being received by UID-transponder 20 or vice versa. In this determination it is assumed that the UID-transponder 20 is located at the location as measured in step 55 and the position of the second antenna 14 is known a priori by design. According to step 70, the actual signal strength of the signal being sent by the additional antenna (so called second antenna 14) and being received by UID-transponder 20 or vice versa is measured. As apparent the sequence of steps 65 and 70 may be altered, but both are a prerequisite for testing a third authorization condition in step 80: Is the predicted signal strength within a predefined accuracy identical to the measured signal strength? If the answer is NO (box 80→NO), a relay attack is probable and the method continues to Step 90. In Step 90 at least one further authorization condition is tested to exclude a relay attack. In case the further authorization condition is not met (box 90→NO), the method continues with box 40. Step 90 is optional. If step 90 is not implemented, and the third authorization condition is not met (box 80→NO), the method may directly return to box 40. In fact this is the same as "a further authorization condition is not met" (box 90→NO), as this is TRUE if a further authorization condition is not defined.

In case the third authorization condition 80 is met (box 80→YES), a relay attack is unlikely and access to the vehicle may be granted by the controller 15.

Turning back to optional box 90, further authorization conditions may be, e.g. determining a trajectory of the UID-transponder based on repetitive triangulating the location of UID-transponder and providing access if the trajectory meets a predefined trajectory condition as explained above (trajectory condition). Other possible further conditions are e.g. the velocity condition, acceleration condition and/or orientation condition as explained above.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for wirelessly accessing a vehicle, the method comprising:
   exchanging data between a UID-transponder and the vehicle to verify as a first authorization condition a general authorization of the UID-transponder;
   triangulating a location of the UID-transponder relative to the vehicle using at least three first antennas being positioned at three different first positions of the vehicle to determine a triangulated location;
   providing access to the vehicle under the first authorization condition that the UID-transponder is identified as an authorized UID-transponder and if the triangulated location meets a second authorization condition;
   determining, based on the triangulated location, a first estimate value of a received signal strength of a signal being transmitted with a known power from at least one second antenna to the UID-transponder or vice versa, the second antenna being positioned at a second position of the vehicle;
   measuring the received signal strength of the signal being emitted with the known power by one of the UID-transponder or the at least one second antenna to determine a measured received signal strength;
   determining if a third authorization condition is met by determining if the first estimate value of the received signal strength matches, within a predefined accuracy, the measured received signal strength;
   considering a case where the first and second authorization conditions are met but the third authorization condition is not met as an attempt of a relay attack; and
   granting access to the vehicle although the first and second authorization conditions are met but the third authorization condition is not met, if at least one further authorization condition is met.

2. The method of claim 1, further comprising: determining a trajectory of the UID-transponder based on repetitively triangulating the location of UID-transponder relative to the vehicle and granting access only if the trajectory meets the further authorization condition.

3. The method of claim 2, further comprising: measuring an acceleration of the UID-device in space and testing if the acceleration complies with the trajectory, thereby defining the further authorization condition.

4. The method of claim 1, further comprising: determining a velocity as a function of time of the UID-transponder relative to the vehicle based on iteratively triangulating the location of UID-transponder relative to the vehicle and/or based on the measured received signal strength of the signal being exchanged between the UID-transponder and at least one second antenna and providing access only if the velocity meets the further authorization condition.

5. The method of claim 4, further comprising: measuring an acceleration of the UID-device in space and testing if the acceleration complies with the velocity, thereby defining the further authorization condition.

6. The method of claim 1, further comprising: measuring an orientation of magnetic field vectors of signals being emitted by at least two of the first and second antennas by the UID-transponder, and to provide access only if the orientation of the magnetic field vectors match the further authorization condition.

7. The method of claim 1, further comprising: measuring an orientation of magnetic field vectors of signals being emitted by at least two of the first and second antennas by the UID-transponder; and determining an orientation of the UID-transponder relative to the vehicle based on the orientation of the magnetic field vectors and granting access only if the determined orientation matches the further authorization condition.

8. The method of claim 1, wherein the at least one further authorization condition is met upon verification of the presence of the UID-device via a mechanical and/or electrical contact with the vehicle and/or upon a signal being provided by the UID-transponder in response to a manual actuation of a sensor being attached to the UID-transponder.

9. A system comprising:
   a main controller being configured to receive signals from a set of antennas and/or to emit signals via at least one antenna;
   a UID-transponder with a UID-controller; and
   at least one UID-antenna,
   wherein the system is configured to provide or deny access to a vehicle according to claim 1.

10. A method for wirelessly accessing a vehicle, the method comprising:
    exchanging data between a UID-transponder and the vehicle to verify as a first authorization condition a general authorization of the UID-transponder;
    triangulating a location of the UID-transponder relative to the vehicle using at least three first antennas being positioned at three different first positions of the vehicle to determine a triangulated location;
    providing access to the vehicle under the first authorization condition that the UID-transponder is identified as an authorized UID-transponder and if the triangulated location meets a second authorization condition;
    determining, based on the triangulated location, a first estimate value of a received signal strength of a signal being transmitted with a known power from at least one second antenna to the UID-transponder or vice versa, the second antenna being positioned at a second position of the vehicle;
    measuring the received signal strength of the signal being emitted with the known power by one of the UID-transponder or the at least one second antenna to determine a measured received signal strength;
    determining if a third authorization condition is met by determining if the first estimate value of the received signal strength matches, within a predefined accuracy, the measured received signal strength;
    considering a case where the first and second authorization conditions are met but the third authorization condition is not met as an attempt of a relay attack; and
    denying access to the vehicle for a given amount of time based on a condition that the first and second conditions have been met, but the third condition was not met.

11. The method of claim 10, wherein the given amount of time increases with a number of attempts to gain access to the vehicle by meeting only the first and second authorization conditions.

* * * * *